Feb. 26, 1957 W. W. SLOANE 2,782,902
PROTECTIVE DEVICES FOR BELT CONVEYORS
Filed Nov. 8, 1952 3 Sheets-Sheet 1
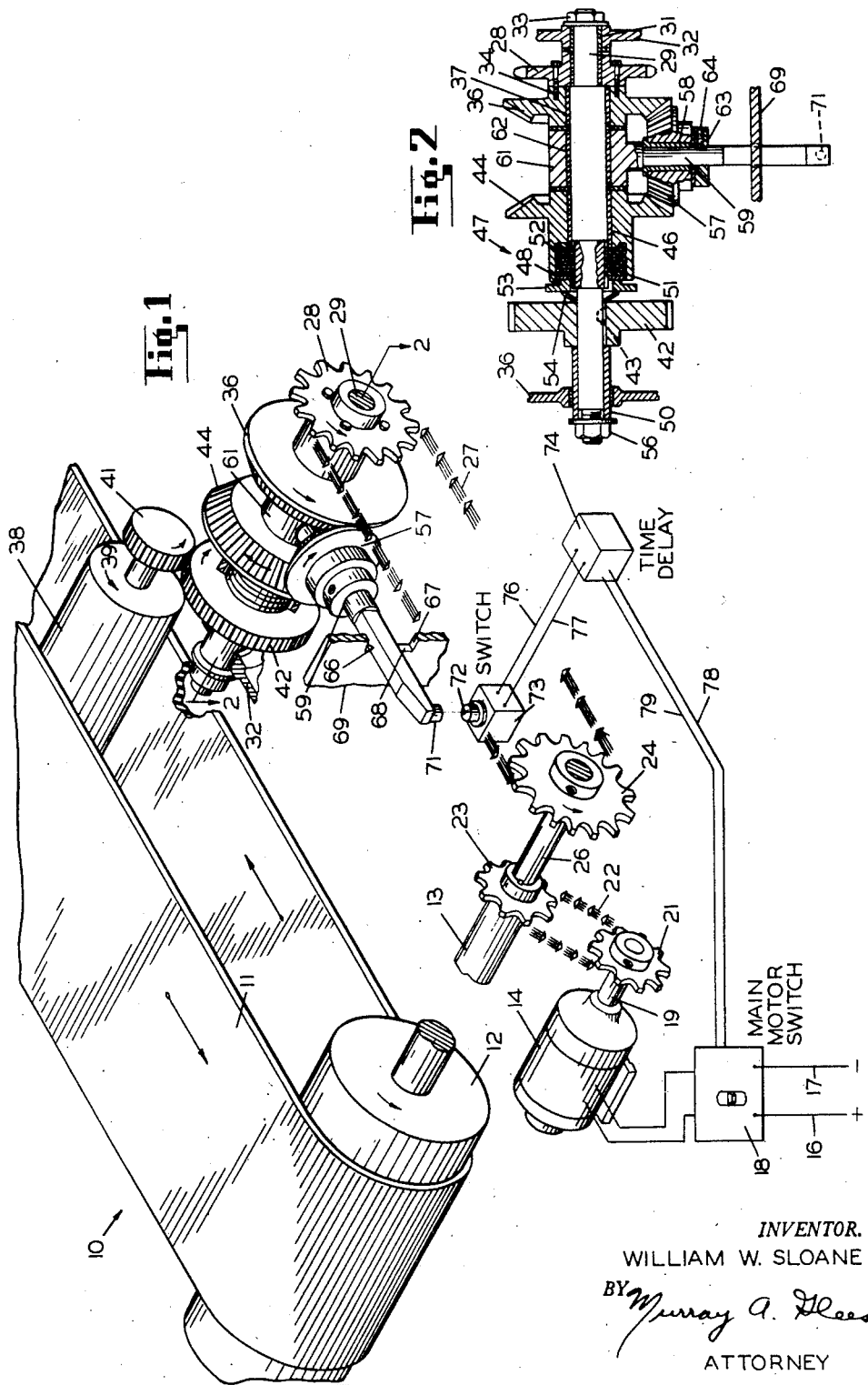
INVENTOR.
WILLIAM W. SLOANE
BY Murray A. Gleeson
ATTORNEY

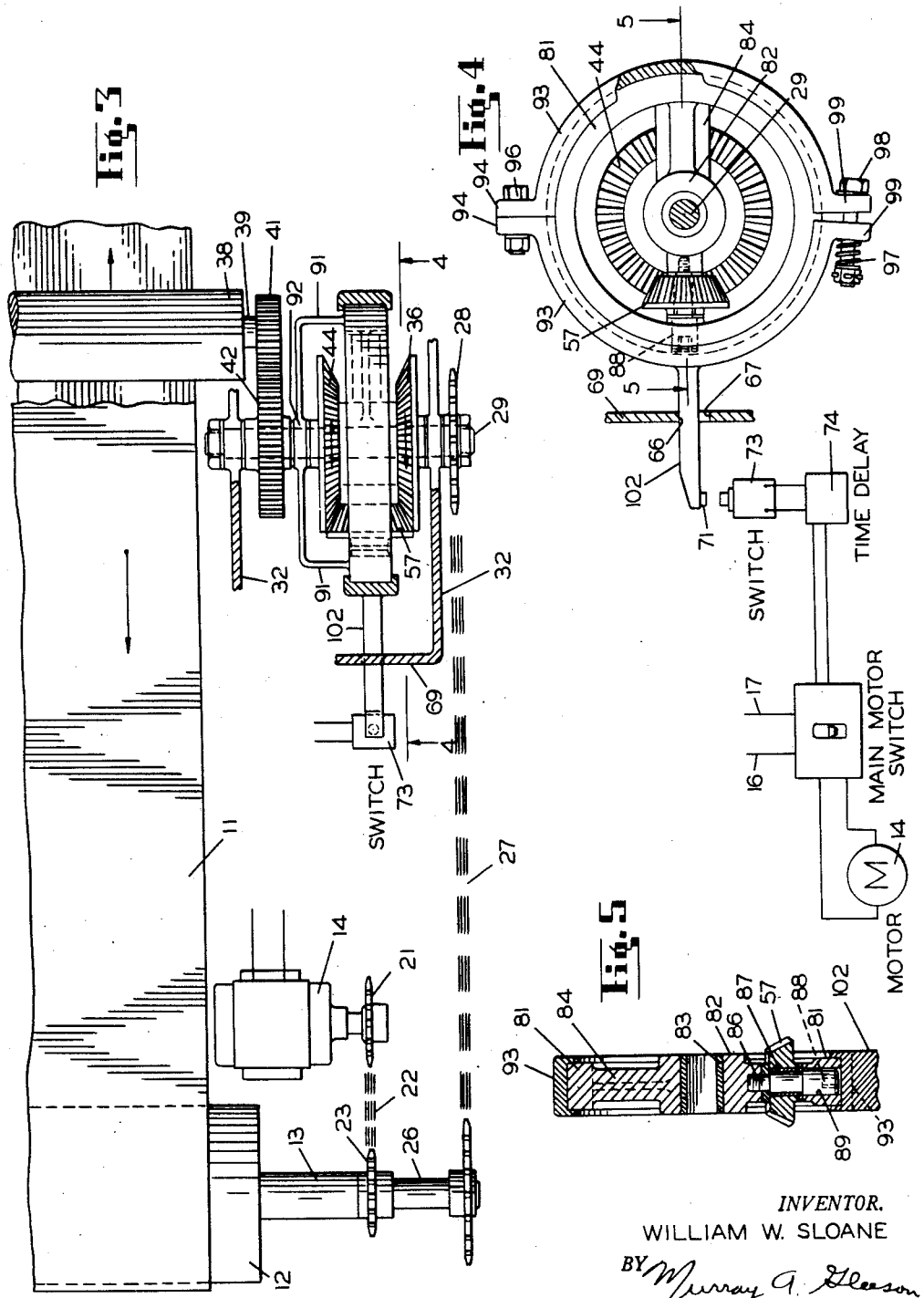

Feb. 26, 1957 W. W. SLOANE 2,782,902
PROTECTIVE DEVICES FOR BELT CONVEYORS
Filed Nov. 8, 1952 3 Sheets-Sheet 3
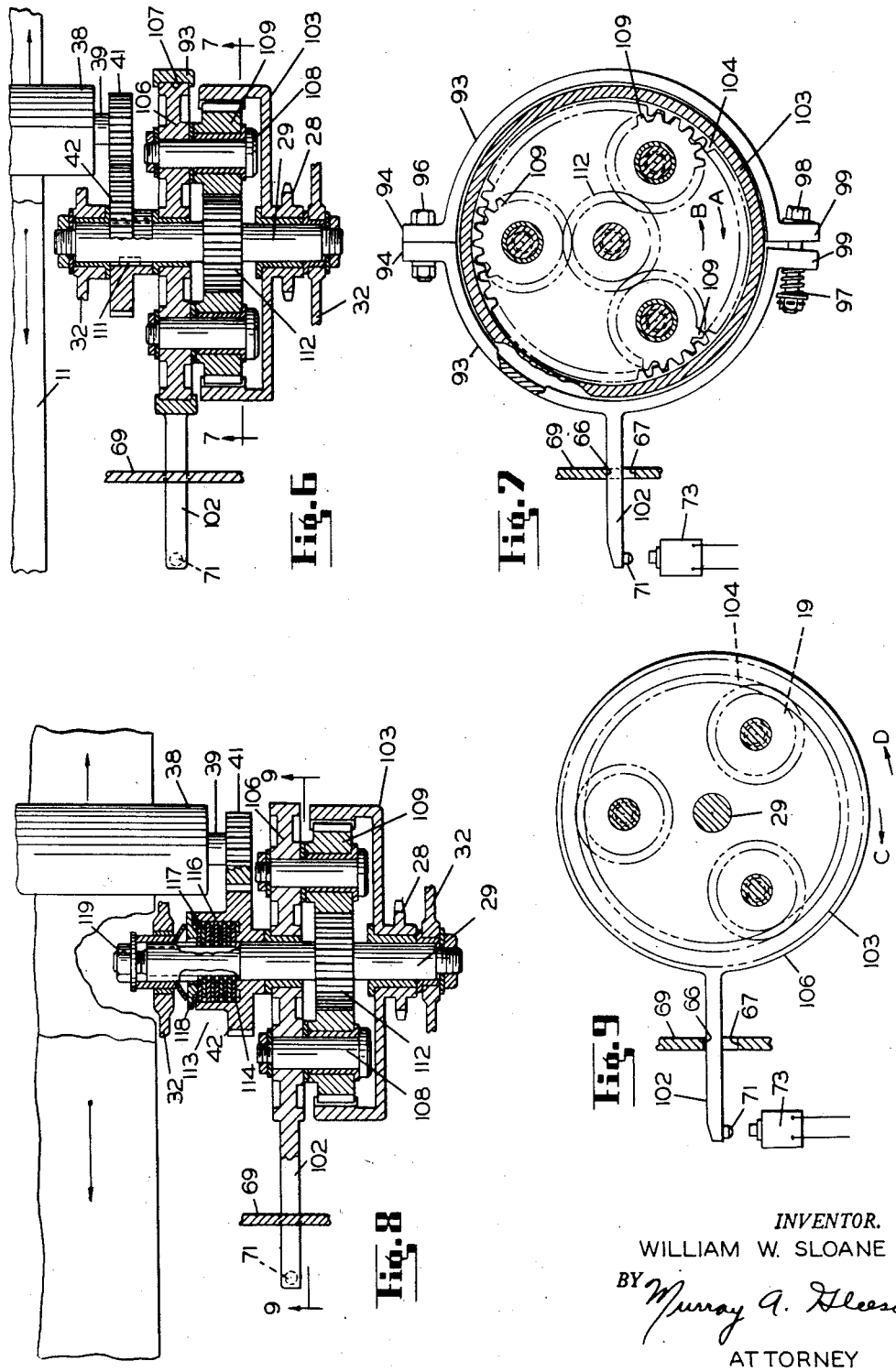
INVENTOR.
WILLIAM W. SLOANE
BY Murray A. Gleeson
ATTORNEY

United States Patent Office 2,782,902
Patented Feb. 26, 1957

2,782,902

PROTECTIVE DEVICES FOR BELT CONVEYORS

William W. Sloane, Chicago, Ill., assignor to Goodman Manufacturing Company, Chicago, Ill., a corporation of Illinois Application November 8, 1952, Serial No. 319,551

10 Claims. (Cl. 198—203)

This invention relates generally to belt conveyors and relates particularly to devices for protecting the belt against costly fires occasioned by slippage thereof on the driving roller or pulley.

In belt conveyor installations it sometimes happens that the belt slips on the driving drum or pulley to such an extent that enough heat is generated to set fire to the belt or cause explosions. Previous protective devices for opening the circuit to the driving motor upon occurrence of such slippage have generally been in the form of a centrifugal switch operated by a roller contacting the return reach of the belt. As long as the speed of the belt was above a certain minimum the switch contacts remained closed and the circuit to the drive motor also remained closed.

In the event of excessive line drop the driving motor would not operate at proper speed and obviously the belt would not be driven at proper speed. Since the switch described above was actually not sensitive to the amount of slippage, and only to the speed of the belt, such excessive line drop would cause the switch to open thereby opening the motor circuit although no slippage in fact had taken place between the drum and the belt.

According to the present invention, mechanism is provided to measure both the speed of the belt and the speed of the driving pulley or drum, and to measure the differential of such speeds, and to employ the measured differential when in an amount in excess of a predetermined value and of a duration exceeding a predetermined value to control means for stopping the motor driving the pulley or drum.

It is, accordingly, a principal object of this invention to afford a protective device for a belt conveyor which will operate when the slippage of the belt is in excess of a predetermined amount and duration to control the driving motors for the belt.

Other objects and important features of the invention will become apparent from a study of the following specification taken with the drawings which together show some preferred embodiments of the invention and what are now considered to be the best modes of practicing the principles thereof. Other embodiments of the invention will be suggested to those having the benefit of the teachings herein and it is therefore intended that the scope of the invention not be limited by the precise embodiments herein shown, the scope of the invention being intended to be defined only by the subjoined claims.

In the drawings:

Fig. 1 is a perspective view of a belt conveyor having embodied therein the improvements according to the present invention;

Fig. 2 is section taken along the line 2—2 of Fig. 1 looking in the direction of the arrows;

Fig. 3 is a plan view of a belt conveyor having embodied therein another form of the invention;

Fig. 4 is a view taken along the line 4—4 of Fig. 3 looking in the direction of the arrows;

Fig. 5 is a sectional view taken along the line 5—5 of Fig. 4 looking in the direction of the arrows;

Fig. 6 is a partial plan view of a belt conveyor having embodied therewith still another form of the invention;

Fig. 7 is view taken along the line 7—7 of Fig. 6;

Fig. 8 is a partial plan view of a belt conveyor having embodied therewith yet another form of the invention; and Fig. 9 is a view taken along the line 9—9 of Fig. 8.

Referring now particularly to Figs. 1 and 2 of the drawings, the protective device according to the present invention is adapted for use with a belt conveyor indicated generally by the reference numeral 10 and including a belt 11 which is trained around a driving roller 12 turning with a shaft 13. A combined drive motor and speed reducer 14 for the roller 12 is supplied with power by leads 16 and 17 connected through a main motor switch 18. The motor and speed reducer 14 has a shaft 19 having a sprocket 21 fast thereon. A drive chain 22 is trained around a sprocket 21 and drives a sprocket 23 made fast to the drive shaft 13.

The mechanism thus far described is conventional for use in conveying coal or other fragmented material from the inby end of a mine or the like to the portal or outby end. Such conveyors are ofttimes operated in gaseous areas, and if slippage occurs between the driving pulley 12 and the belt 11, as would be occasioned by lack of tension on the belt or a load thereon in excess of a safe value, such slippage may create sufficient heat to cause burning of the belt and consequent dangerous fires or explosions.

The invention herein has for its principal object to avert such fires or explosions, at the same time enabling the belt and its driving pulley to have an allowable degree of slippage therebetween, and at the same time permitting of short durations of slippage in excess of a safe amount, such periods not being of sufficient duration to cause such burning or explosions.

The conveyor belt 10 is accordingly arranged with means for measuring the speed of the driving pulley 12 and means for measuring the speed of the return reach of the belt, said speed measuring means being then employed to cooperate with means measuring the differential of such speeds. Such measured differential provides means for actuating a switch when the differential is in excess of a permitted amount. This switch is arranged in circuit with a time delay relay arranged to open the main switch to the drive motor when the excessive differential in speed between the driving pulley and the belt is maintained for a period in excess of a predetermined amount.

To this end a sprocket 24 is made fast to a stub extension 26 of the drive shaft 13. The chain sprocket 24 drives a chain 27 trained around a sprocket 28 arranged to turn on a shaft 29 supported in a bushing 31 held in a frame member 32. The shaft 29 is held in position on the frame member 32 by a nut 33 threaded to the end thereof as seen in Fig. 2. The driven sprocket 28 is held by cap screws 34 to a bevel differential gear 36 mounted on a bushing 37 and arranged to turn with respect to the shaft 29. It will be seen that the sprocket 28 and the bevel differential gear 36 turn at a speed in accordance with the speed of the driving pulley 12.

The movement of the return reach of the belt 11 is caused to turn a roller 38 fast to a shaft 39 having turning therewith a gear 41. A gear 42 is held by a key 43 to the shaft 29 and meshes with the gear 41. A bevel differential gear 44 is supported on a bushing 46 located on the shaft 29. A driving connection is provided between the gear 42 and the bevel differential gear 44 by means of a multiple disc slip clutch indicated generally by the reference numeral 47. Pressure plates 48 of the slip clutch 47 are supported on the shaft 29 and are splined at the outer peripheries thereof to a hub 49 of the bevel differential gear 44. Friction discs 51 are inter-leaved with the pressure plates 48 and have an internal splined connection with splines 52 formed on the shaft 29. A pressure applying member 53 is interposed between the outermost pressure plate 48 and a spring disc 54 lying between the pressure applying member 53 and the gear 42. The amount of slippage of the clutch 47 is adjusted by turning a nut 56 threaded to the end of the shaft 29 and bearing against a sleeve 50 supported on the shaft 29 and in turn bearing against the hub of the gear 42. It will be seen that the gear 42 may drive the bevel differential gear 44, but that when the bevel gear 44 is restrained in its rotation, the clutch 47 will slip during such restraint.

An idler bevel gear 57 meshing with the bevel differential gears 36 and 44 is mounted to turn on a bushing 58 supported on a stub extension 59 from a hub 61 interposed between the beveled differential gears 36 and 44 and arranged to revolve on a bushing 62 supported on the shaft 29. A collar 63 held in place by a set screw 64 holds the bevel pinion 57 in mesh with the bevel differential gears 36 and 44. The stub extension 59 is arranged at times to move up and down between shoulders 66 and 67 of a slot 68 formed in a portion 69 of the frame member 32.

The bevel differential gears 36 and 44 are arranged as seen in Fig. 1 to turn in opposite directions. The sensing roller 36 is so arranged with its gear train 41 and 42 and its associated bevel differential gear 44 so as to turn bevel gear 44, by way of example, at 101 R. P. M. The sprockets 24 and 28 and their associated bevel differential gear 36 are arranged to be driven by the driving roller 12 at a speed, by way of example, of 100 R. P. M. Such speed of the differential gear 36 is assumed to be for a condition where the belt 11 is not slipping on the pulley 12 or for a condition where the slippage does not exceed one percent, a permissible amount of slip. Such a differential in rotation of one R. P. M. of the two beveled differential gears 36 and 44 would cause the extension 59 to move upwardly as seen in Fig. 1 against the shoulder 66, at which time the two gears 36 and 44 must of necessity turn at the same speed but in different directions. The slip clutch 47 interposed between the differential gear 44 and the gear 42 enables the gear 42 to turn at its previous rate which was stated for purposes of explanation, to be at 101 R. P. M.

Assume now a condition whereby the belt 11 is slipping on the driving pulley 12 to an extent exceeding the permissible one percent. Such a condition would of course cause the bevel gear 36 to turn relatively faster than the bevel gear 44. Such a condition would therefore cause the extension 59 to move downward against the shoulder 67 on the guide 69. Under such condition of operation the bevel gear 36 is of course free to turn upon the shaft 29 and in mesh with the beveled pinion 57. Since the two beveled gears 36 and 44 travel at different rates of speed, the restraint of movement of the shaft extension 59 by the shoulder 67 requires that the slip clutch 47 accommodate the difference in speed of the bevel gears 36 and 44.

The end of the extension 59 is provided with an actuator 71 which contacts a switch button 72 of a switch 73. A time delay relay 74 is connected in circuit by means of leads 76 and 77 and is further connected in circuit with the main motor switch 18 by means of leads 78 and 79. However, the momentary closing of the switch 73 by the actuator button 71 will not energize the time delay relay 74 for a period long enough to open the main motor switch 18, and the excessive slippage between the pulley and belt must be maintained for a time period long enough to energize the time delay relay.

It will be seen thereby that the protective device thus far described will permit slippage of the belt 11 upon the driving pulley 12 for periods of short duration, but that if such slippage is maintained for a period longer than that required to energize the time delay relay 74, the circuit to the motor 14 through the main motor switch 18 will be open, thereby preventing any possibility of fires or explosion.

Referring now particularly to Figs. 3, 4 and 5 of the drawings there is shown another embodiment of the invention in which the differential mechanism for effecting control of the circuit to the drive motor is constructed in somewhat different fashion. In the several figures relating to this second embodiment of the invention, mechanism which is common to the embodiment shown in Figs. 1, 2 and 3 will be adverted to by the same reference numerals.

The differential mechanism for achieving operation of the switch 73 and the time delay relay 74 thus consists of the bevel gears 44 and 36. The bevel pinion 57 meshes with the differential bevel gears 36 and 44 and is supported on a cage 81 with a radial spoke 84 having a central hub 82 provided with a bushing 83 supported on the shaft 29. As seen in Figs. 4 and 5, the hub is tapped at 86 radially thereof to receive a stub shaft 87 supporting the bevel pinion 57, the stub shaft 87 having a socket head 88 held within a recess 89 formed in the rim of the cage 81.

The cage 81 also has spider arms 91 which are joined at their centers by a hub 92 having bearing support on the shaft 29, thereby giving stability to the cage 81 upon the shaft 29.

The periphery of the cage 81 is encircled by split clutch members 93 joined together at flanges 94 by a cap bolt 96. The degree of clutching is adusted by a spring 97 encircling an adjusting bolt 98 passing through openings, not shown, in flanges extensions 99 from the clutch 93, positioned diametrically from the flanges 94.

As seen in Fig. 4 the left hand clutch member 93 has an extension 102 therefrom having the switch actuator 71 at the end thereof.

During normal operation of the belt when the pulley 12 is not slipping with respect to the belt 11 or during periods when the permissible slip between the two is less than an allowable amount, the two bevel differential gears 36 and 44 are arranged to run, by way of example, at speed of 100 R. P. M. and 101 R. P. M. respectively. Since the bevel differential gear 44 has the higher speed it will cause the cage 81 to rotate in a clockwise direction, as seen in Fig. 4, at the same time rotating the extension arm 102 in a clockwise direction until it strikes the upper stop 66 at which time the clutch members 93 will slip with respect to cage 81 thereby enabling the cage together with its beveled pinion 57 to rotate according to the differential rotation of the gears 36 and 44.

Under condition when the belt 11 is slipping upon the pulley 12, the beveled differential gear 36 will rotate at a higher speed relative to the gear 44 causing the cage 81 to be rotated in a counterclockwise direction moving the extension arm 101 downward against the lower stop 67, the cage 81 continuing the counterclockwise movement in accordance with the amount of differential rotation of the differential gears 36 and 44. If the extension arm 101 is maintained against the lower stop 67 the switch 73 will be actuated for a period sufficiently long to energize the time delay relay 74 in the manner as previously described. As with the embodiments shown in Figs. 1 and 2, the differential mechanism will thus enable the belt to have limited and permissible slipping movement with respect to the driving pulley 12, at which time the extension arm 101 will be in engagement with the upper stop 66. Slippage in excess of such permissible amount will, of course, cause the differential gear 36 to travel faster than the differential gear 44, and in the opposite direction, thereby causing the extension arm to move downward and close the switch 73. If such closing is maintained for a period long enough to energize the relay the circuit to the drive motor 14 will be opened.

Referring now to Figs. 6 and 7 of the drawings, there is shown still another embodiment of the invention in which the differential mechanism for effecting control of the circuit to the drive motor is constructed in still another manner. Elements which are common to the previously described embodiments will be adverted to by the same reference numerals.

In this embodiment of the invention, the sprocket 28 is mounted freely on the shaft 29 and is driven at a speed corresponding to that of the driving roller 12. The sprocket 28 is arranged fast to a cage 103 having internal gear teeth 104. A planetary spider 106 has a circular periphery 107 and supports stub shafts 108 carrying planet pinions 109 meshing with the teeth 104 of the cage 103.

The gear 42, which is driven by the sensing roller 38, is held fast to the shaft 29 by a key 111 and drives a sun gear 112 fast to the shaft 29.

Split clutch members 93 encircle the spider 106 and are joined together by the cap bolt 96. The degree of clutching engagement is adjusted by the spring 97 encircling the adjusting bolt 98 passing through flanges 99 diametrically of the flanges 94. The left hand clutch member 93 is provided with extension 102 for the switch actuator 71 which actuates the switch 73.

The planetary train consisting of the sun gear 112, planet gears 109 and ring gear 104 is designed with tooth ratios so that during normal operation of the belt 11, and during periods when the slippage is below a permissible amount, the spider 106 will rotate in a clockwise direction as seen in Fig. 7. In so doing, it will tend at all times to rotate the clutch members 93 in a clockwise direction moving extension 102 against the stop 66. Arrow A shows the direction of rotation of the spider 106 during such condition of the belt. During such rotation of the spider 106, the clutch 93 will slip with respect to the spider 106 along the periphery 107 thereof.

Under conditions when the belt 11 is slipping upon its drive roller 12, to an extent exceeding the permissible amount stated, the sprocket 28 and the cage 103 will rotate relatively faster than in the previous condition described. In so doing, the spider 106 will rotate in a counterclockwise direction at the same time carrying the slip clutch members 93 until the extension arm 102 bears against the lower stop 67 with the actuator 71 closing the switch 73. Arrow B shows the direction of rotation of the spider 106 under this condition. If the condition described obtains for a sufficiently long period of time, the time delay relay 74, shown in Fig. 1, will be energized to open the circuit to the drive motor 14.

Referring now to Figs. 8 and 9 of the drawings, there is shown yet another form of the invention, in which the differential mechanism of Figs. 6 and 7 is modified somewhat. As with the embodiments previously described, elements which are common to all will be adverted to by the same reference numerals.

In this embodiment the sprocket 28 is freely mounted on the shaft 29 and is driven by the driving roller 12. The sprocket 28 is fast to the cage 103 which has internal gear teeth 104 meshing with the planet pinions 109 supported on the spider 106. The planet pinions 109 mesh with the sun gear 112 which is fast on the shaft 29.

The shaft 29 is driven by the gear 42 through a clutching connection indicated generally by the reference numeral 113. As with the previous embodiments the gear 42 is driven by the gear 41 turning with the sensing roller 38 which contacts the lower reach of the belt 11.

The slip clutch 113 comprises pressure discs 114 splined along their outer peripheries to an internally splined hub 116 of the gear 42, which is mounted freely upon the shaft 29. The pressure discs 114 are interleaved with friction discs 117 which are splined along their inner peripheries to the shaft 29. The pressure between the pressure discs 114 and the friction discs 117 is adjusted by a pressure plate 118 and a spring disc 54 adjusted in its load by sleeve 50 surrounding the shaft 29 and held in position between the spring disc 54 and a nut 119 threaded to the end of the shaft 29.

The spider 106 is formed with the extension arm 102 which extends through the slot 68 in the portion 69 of the housing 32. The end of the arm 102 supports the actuator 71 for the switch 73.

As with the embodiment shown in Figs. 6 and 7, the planetary train consisting of sun gear 112, planet pinions 109 and internal ring gear 104 is designed with tooth ratios so that during normal operation of the belt conveyor, and during periods when the slippage is below a permissible value, the spider 106 will tend to be rotated in a clockwise direction as seen in Fig. 9. Its rotation will be restrained, however, since the extension arm 102 will engage the upper stop 66. The slip clutch 113 will of course enable the gear 42 to overrun the shaft 29 and sun gear 112 during such condition. Arrow C shows the direction in which the spider 106 tends to be rotated.

Under conditions when the belt 11 is slipping upon its drive roller 12, the sprocket 28 and the cage 103 will rotate relatively faster than in the previous condition described. Under such condition the spider 106 tends to be rotated in a counterclockwise direction, as shown by the arrow D, causing the extension arm to move against the lower stop 67 with the switch 73 actuated. The sun gear 112 under such condition will overrun the gear 42 and the provision of the slip clutch 113 permits of such overrunning. If the condition described obtains for a sufficiently long period of time, the time delay relay 74, shown in Fig. 1, will be energized to open the circuit to the drive motor 14.

From the foregoing description of the several embodiments of the invention it will be apparent that there has been provided a number of novel mechanisms for protecting the belt of a belt conveyor against fire. The novel mechanisms according to the present invention also enable the belt to have slippage in excess of a permissive amount for short intervals of time without opening the circuit to the driving motor during such brief intervals.

While the invention has been described in terms of some preferred embodiments thereof its scope is not intended to be limited by the several embodiments herein shown and only by the spirit and breadth of the claims here appended.

I claim:

1. In a belt conveyor, a protective device operable upon slippage in excess of a predetermined amount between the motor driven pulley and the belt of such conveyor which comprises means responsive to the difference in the speed of said belt and said pulley occasioned by slippage of said belt on said pulley, said means including a differential gear driven by said pulley, a differential gear driven by said belt, a support for a gear meshing with said differential gears, a switch controlled by the movement of said support for opening the circuit to the motor driving said pulley, and means affording a slipping connection between one of said differential gears and its driving means whereby said support may be held in position where said switch is maintained in open condition during permissible slippage of said belt, and whereby said support is held in position actuating said switch during period of excessive slippage of said belt, and time delay means connected in circuit with said switch for presenting the opening of the circuit to said motor when excessive slippage takes place for periods of short duration only.

2. In a belt conveyor, a protective device operable upon slippage in excess of a predetermined amount between the motor driven pulley and the belt of such conveyor which comprises means responsive to the difference in the speed of said belt and said pulley occasioned by slippage of said belt on said pulley, said means including a differential gear driven by said pulley, a differential gear driven by said belt, a support for a gear meshing with said differential gears, means controlled by the movement of said support for opening the circuit to the motor driving said pulley, and means included with said last named means for preventing the opening of said circuit when slippage takes place between said belt and said pulley for periods of relatively short duration.

3. In a belt conveyor, a protective device operable upon slippage in excess of a predetermined amount between the motor driven pulley and the belt of such conveyor which comprises means responsive to the difference in the speed of said belt and said pulley occasioned by slippage of said belt on said pulley, means controlled by said last named means for opening the circuit to the motor driving said pulley, and means included with said last named means for preventing the opening of said circuit when slippage takes place between said belt and said pulley for periods of relatively short duration only.

4. In a belt conveyor, a protective device operable upon slippage in excess of a predetermined amount between a motor driven pulley and the belt of such conveyor which comprises means responsive to the difference in speed of said belt and said pulley occasioned by the slippage of said belt on said pulley, said means including a differential gear driven by said pulley, a differential gear driven by said belt, a support for a gear meshing with said differential gears, an actuating arm mounted on said support and in sliding frictional engagement therewith, and a switch controlled by the movement of said actuating arm for opening the circuit to the motor driving said pulley, said actuating arm being moved out of engagement with said switch during normal operation and permissible slippage of said belt, said actuating arm being moved into engagement with said switch during periods of excessive slippage of said belt, and means connected in circuit with said switch for preventing the opening of the circuit to said motor when excessive slippage takes place for periods of short duration only.

5. In a belt conveyor, a protective device operable upon slippage in excess of a predetermined amount between a motor driven pulley and the belt of such conveyor which comprises means responsive to the difference in speed of said belt and said pulley occasioned by the slippage of said belt on said pulley, said means including a differential gear driven by said pulley, a differential gear driven by said belt, a support for a gear meshing with said differential gears, an actuating arm mounted on said support, a switch controlled by the movement of said actuating arm for opening the circuit to the motor driving said pulley, and means connected in circuit with said switch for preventing opening of the circuit to said motor when excessive slippage takes place for periods of short duration only.

6. In a belt conveyor, a protective device operable upon slippage in excess of a predetermined amount between the motor driven pulley and the belt of such conveyor which comprises means responsive to the difference in the speed of said belt and said pulley occasioned by slippage of said belt on said pulley, said means including a bevel differential gear driven by said pulley, a bevel differential gear driven by said belt, a support for a bevel gear meshing with both of said bevel differential gears, a switch controlled by the movement of said support for opening the circuit to the motor driving said pulley, and means affording a slipping connection between one of said bevel differential gears and its driving means whereby said support may be held in position where said switch is maintained in open condition during permissible slippage of said belt, and whereby said support is held in position actuating said switch during period of excessive slippage of said belt, and means connected in circuit with said switch for preventing the opening of said circuit to said motor when excessive slippage takes place for periods of short duration only.

7. In a belt conveyor, a protective device operable upon slippage in excess of a predetermined amount between a motor driven pulley and the belt of such conveyor which comprises means responsive to the difference in speed of said belt and said pulley occasioned by the slippage of said belt on said pulley, said means including a bevel differential gear driven by said pulley, a bevel differential gear driven by said belt, a support for a bevel gear meshing with both of said bevel differential gears, an actuating arm mounted on said support and in sliding frictional engagement therewith, and a switch controlled by the movement of said actuating arm for opening the circuit to the motor driving said pulley, said actuating arm being moved out of engagement with said switch during normal operation and permissible slippage of said belt, said actuating arm being moved into engagement with said switch during periods of excessive slippage of said belt, and time delay means connected in circuit with said switch for preventing the opening of said circuit to said motor when excessive slippage takes place for periods of short duration only.

8. In a belt conveyor, a protective device operable upon slippage in excess of a predetermined amount between the motor driven pulley and the belt of such conveyor which comprises means responsive to the difference in the speed of said belt and said pulley occasioned by slippage of said belt in said pulley, said means including a planetary gear train having a gear thereof driven by said pulley, a second gear thereof driven by said belt, and a third gear meshing with said gears and mounted on a support shiftable in accordance with the change in relative speeds of said first and second gears, and means controlled by the shifting of said support for controlling the circuit to the motor driving said pulley.

9. In a belt conveyor, a protective device operable upon slippage in excess of a predetermined amount between the motor driven pulley and the belt of such conveyor which comprises means responsive to the difference in the speed of said belt and said pulley occasioned by slippage of said belt on said pulley, said means including a planetary gear train having a gear thereof driven by said pulley, a second gear thereof driven by said belt, and a third gear meshing with said gears and mounted on a support shiftable in accordance with the change in relative speeds of said first and second gears, an actuating arm mounted on said support and in sliding frictional engagement therewith, and a switch controlled by the movement of said actuating arm for opening the circuit to the motor driving said pulley, said actuating arm being moved out of engagement with said switch during normal operation and permissible slippage of said belt, and being moved into engagement with said switch during periods of excessive slippage of said belt, and time delay means connected in circuit with said switch for preventing the opening of said circuit to said motor when excessive slippage takes place for periods of short duration only.

10. In a belt conveyor, a protective device operable upon slippage in excess of a predetermined amount between the motor driven pulley and the belt of such conveyor which comprises means responsive to the difference in the speed of said belt and said pulley occasioned by slippage of said belt on said pulley, and means including a planetary gear train having a gear thereof driven by said pulley, a second gear thereof driven by said belt, and a third gear meshing with said gears and mounted on a support shiftable in accordance with the change in relative speeds of said first and second gears, a switch controlled by the movement of said support for opening the circuit to the motor driving said pulley, and means affording a slipping connection between one of said first two named gears of said planetary train and its driving means whereby said support may be held in position where said switch is maintained in open position during permissible slippage of said belt, and whereby said support is held in position actuating said switch during periods of excessive slippage thereof, and means connected in circuit with said switch for preventing the opening of said circuit to said motor when excessive slippage takes place for periods of short duration only.

References Cited in the file of this patent

UNITED STATES PATENTS

| | | |
|---|---|---|
| 1,477,840 | Mortensen | Dec. 18, 1923 |
| 1,528,030 | Smith | Mar. 3, 1925 |
| 1,620,532 | Fisher | Mar. 8, 1927 |
| 2,054,908 | Moore | Sept. 22, 1936 |